United States Patent
Berenbaum et al.

(10) Patent No.: US 7,991,943 B2
(45) Date of Patent: Aug. 2, 2011

(54) IMPLEMENTATION OF ONE TIME PROGRAMMABLE MEMORY WITH EMBEDDED FLASH MEMORY IN A SYSTEM-ON-CHIP

(75) Inventors: Alan D. Berenbaum, New York, NY (US); Richard E. Wahler, St. James, NY (US); Raphael Weiss, Plainview, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 722 days.

(21) Appl. No.: 11/924,826

(22) Filed: Oct. 26, 2007

(65) Prior Publication Data

US 2009/0113114 A1 Apr. 30, 2009

(51) Int. Cl.
*G06F 12/02* (2006.01)
(52) U.S. Cl. .................. 711/103; 711/163; 711/E12.008
(58) Field of Classification Search .................. 711/103, 711/163
See application file for complete search history.

(56) References Cited

U.S. PATENT DOCUMENTS

| | | | |
|---|---|---|---|
| 6,968,420 B1 | 11/2005 | Giles et al. | |
| 7,117,352 B1 | 10/2006 | Giles et al. | |
| 7,254,716 B1 | 8/2007 | Giles et al. | |
| 7,254,720 B1 | 8/2007 | Giles et al. | |
| 7,355,878 B1 * | 4/2008 | Hubbard | 365/94 |
| 7,362,610 B1 | 4/2008 | Salter, III et al. | |
| 2006/0090084 A1 * | 4/2006 | Buer | 713/189 |
| 2006/0107047 A1 | 5/2006 | Bar-El | |
| 2007/0041246 A1 | 2/2007 | Smith et al. | |
| 2007/0092082 A1 | 4/2007 | Rush | |
| 2007/0183181 A1 * | 8/2007 | Peng et al. | 365/96 |
| 2008/0016395 A1 * | 1/2008 | Feng | 714/27 |

* cited by examiner

*Primary Examiner* — Mardochee Chery
(74) *Attorney, Agent, or Firm* — Meyertons Hood Kivlin Kowert & Goetzel, P.C.; Jeffrey C. Hood; Mark S. Williams

(57) ABSTRACT

System and method for implementing one time programmable (OTP) memory using embedded flash memory. A system-on-chip (SoC) includes a cleared flash memory array that includes an OTP block, including an OTP write inhibit field that is initially deasserted, a flash memory controller, and a controller. Data are written to the OTP block, including setting the OTP write inhibit field to signify prohibition of subsequent writes to the OTP block. The SoC is power cycled, and, in response, at least a portion of the OTP block is latched in a volatile memory, including asserting an OTP write inhibit bit based on the OTP write inhibit field, after which the OTP block is not writeable. In response to each subsequent power cycling, the controller is held in reset, the latching is performed, the controller is released from reset, and the flash array, now write protected, is configured to be controlled by the controller.

25 Claims, 5 Drawing Sheets

IMPLEMENTATION OF ONE TIME PROGRAMMABLE MEMORY WITH EMBEDDED FLASH MEMORY IN A SYSTEM-ON-CHIP

BACKGROUND OF THE INVENTION

1. Field of the Invention

This invention relates generally to the field of System-on-Chip (SoC) security, and more specifically to implementation of one time programmable memory using embedded flash memory on an SoC.

2. Description of the Related Art

Increasingly, sophisticated hardware systems are implemented on single computer chips. Such a system is referred to as a System-on-Chip (SoC). An SoC generally includes at least one controller and memory, and is generally required to perform auxiliary functions for the system, such as initialization and reset functionality. Moreover, many of these systems include security features that utilize one time programmable (OTP) memory that cannot be reprogrammed or erased. Because OTP memory cannot be modified (after its initial programming), it is suitable for such security functions.

Flash memory, in contrast, can be erased. If an SoC requires a large flash memory, adding OTP can increase costs, since OTP typically requires different processing in manufacture than flash memory, as well as additional area. However, as currently used, flash memory can be erased, which means it cannot be used for security functions, since an attack could erase the flash memory, thereby eliminating the security function.

Other corresponding issues related to the prior art will become apparent to one skilled in the art after comparing such prior art with the present invention as described herein.

SUMMARY OF THE INVENTION

Various embodiments of a system and method for implementing one time programmable (OTP) memory with embedded flash memory on a System-on-Chip (SoC).

An SoC may be provided that includes a flash memory array in a blank or cleared state. The flash memory array preferably includes an OTP block that includes an OTP write inhibit field, where the OTP write inhibit field is deasserted (since the entire memory array is in a blank state). Note that in some embodiments, the flash memory array being in a blank state means that the memory is set to all ones.

Data may be written to the OTP block, including setting the OTP write inhibit field to signify prohibition of subsequent writes to the OTP block. In some embodiments, the SoC also includes a controller and a flash memory controller coupled to the flash memory array for reading from and writing to the flash memory array. The controller may be operable to perform this write to the OTP block including setting the OTP write inhibit field for inhibition of subsequent writes to the OTP block. Note that in various embodiments, the controller (which is distinct from the flash memory controller) may include at least one embedded controller, at least one embedded processor, and/or at least one DMA controller. Note further that the controller may be a hardware controller, or may be a combination of hardware and software.

The SoC may be power cycled, i.e., turned off and back on. As is well known, power cycling may include asserting and deasserting a system reset signal, e.g., a VTR POR signal, which may be used in implementing OTP functionality, as will be described below.

In response to the above power cycling, at least a portion of the OTP block, i.e., data in the OTP block, may be latched in a volatile memory, including asserting an OTP write inhibit bit based on the OTP write inhibit field, after which the OTP block is not writeable. The volatile memory used to latch the data from the OTP block may be or include a volatile register, e.g., an OTP register. As used herein, this volatile memory and the means for latching data in the memory may be referred to as a "latch" or "OTP latch", although it should be noted that this term is intended to denote the latching functionality, not any particular method or means for performing the latching.

In some embodiments, the SoC also includes a controller and a flash memory controller coupled to the flash memory array for reading from and writing to the flash memory array. Latching at least a portion of the OTP block may include: in response to deasserting system reset, holding the controller in reset, sending an address of the OTP block to the flash memory array as input, sequencing the flash memory array to read data from the OTP block at the address, and latching the data read from the OTP block in the volatile memory, including asserting the OTP write inhibit bit. Thus, in some embodiments, the controller may be prevented from doing anything (e.g., reading or writing to flash memory) while the OTP memory block is being initialized and the data are latched. In some embodiments, the flash memory controller may perform this latching of the data.

Note that asserting the OTP write inhibit bit is used to implement or enforce the OTP nature of the OTP block. For example, in response to latching the data, the controller may be released from reset, and the flash array may be configured to be controlled by the controller, where the OTP block is or includes OTP memory. Thereafter, in response to any subsequent power cycling of the SoC, the above latching at least a portion of the OTP block, the releasing the controller from reset, and the configuring the flash array to be controlled by the controller may be performed, thereby initializing or preparing the flash memory system for OTP functionality. Note that since these operations are performed in response to a system reset, by the time the controller is given control of flash memory operations (i.e., is released from reset), the flash OTP memory functionality has been established, including asserting the write inhibit bit, and so the controller never has an opportunity to circumvent the OTP aspects of the OTP block.

In some embodiments, the flash memory controller implements an OTP state machine that includes and utilizes various states to control or orchestrate the above OTP memory functionality. For example, in one embodiment, the OTP state machine includes a first state, in which the controller is held in reset, and the SoC is initialized for the above-described latching; a second state, in which the controller is held in reset, and data are read from the OTP block and latched; and a third state, in which the controller is released from reset, and the flash memory array is configured for use by the SoC, where the OTP block comprises OTP memory. In other words, when the OTP state machine is in the third state, the OTP block in flash memory operates as OTP memory. The following provides more detailed descriptions of some of these states and operations.

It should be noted that these states are meant to be illustrative of the OTP state machine, and should be considered to be exemplary, and not limiting as to the particular number and type of states contemplated. For example, in some embodiments, the first, second, and third states may comprise INIT, READ FLASH, and IDLE, or functional equivalents. In other embodiments, the OTP state machine may operate with only two states, e.g., READ FLASH and IDLE (or functional equivalents). Other states may be used as desired.

Regarding this first state, in one embodiment, in initializing the SoC for latching, the flash memory controller may be initialized for a read operation in the flash memory array, an address input to the flash memory array may be initialized for starting a read at the address of the OTP block, and the volatile memory may be set to capture output of the flash memory array.

A deassertion of the system reset signal (e.g., deassertion of power on reset) may cause a transition of the OTP state machine to the second state, e.g., the READ FLASH state, during which the at least a portion of the OTP block may be read and latched, as described above. In one embodiment, in the data being read from the OTP block and latched, the flash memory array may be sequenced to read the data at the address of the OTP block, and the volatile memory (e.g., an OTP register) may capture and hold the output of the flash memory array to perform the latching of the data.

Once the read from flash memory is complete, the OTP state machine may transition to the third state, e.g., the IDLE state, described above. In one embodiment, in configuring the flash memory array for use by the SoC as OTP memory, control and address signals for the flash memory array from the controller or other components on the SoC may be provided to the flash memory array by the flash memory controller, the volatile memory may retain the value captured during the second state, the controller may be released from reset, and the write inhibit bit may be fed back to the flash memory controller to inhibit any writes to the OTP block. Note that in preferred embodiments, the duration of the READ FLASH state may be a specified time interval that is at least long enough to complete a read from flash memory. However, in other embodiments, the completion of the read from flash memory may be detected, and the OTP may transition to the third state in response to this detection.

Said another way (at a high level), in some embodiments, after system reset (e.g., VTR POR) is deasserted, the controller may be held in reset, and the flash OTP address may be sent to the flash memory address input. The OTP state machine may sequence the flash memory to read the data at the flash OTP address, and the data may be latched in volatile memory, e.g., in an OTP register that is read-only by the software, after which the controller reset may be deasserted, the flash memory address input may be connected to the controller, and the OTP state machine may go idle until the next system reset (e.g., VTR POR). Note that at the end of this sequence, the OTP latch (e.g., the OTP register) contains data that cannot be modified by software, including the write inhibit bit, which inhibits the system from erasing or programming the data at the Flash OTP address. Note that the data stored in the OTP block may include any data that should be kept safe from unauthorized tampering. Examples of data contemplated for storage in the OTP block include, but are not limited to, product-related information, such as serial number, revision number, part number, product options-change features, turn on-off configuration data (e.g., serial connects), calibration information, e.g., A/D D/A calibration information, and so forth, among others.

Thus, in terms of OTP state machine operations, in one embodiment, the performing the latching at least a portion of the OTP block, the releasing the controller from reset, and the configuring the flash array to be controlled by the controller, in response to any subsequent power cycling of the SoC, may include: in response to the asserting system reset, setting the OTP state machine to the first state (e.g., INIT); in response to the deasserting system reset, setting the OTP state machine to the second state (READ FLASH) for a specified time interval, where the specified time interval is equal to or greater than a minimum required read time for the flash memory array; and in response to the specified time interval elapsing, setting the OTP state machine to the third state (e.g., IDLE).

Once the OTP state machine is in the third (e.g., IDLE) state, the controller may perform flash memory reads and writes for the SoC while the OTP state machine is in the IDLE state. Note that the OTP state machine may stay in this third or IDLE state until the next system reset. Thus, once the OTP memory functionality has been established, control of reads and writes to flash memory may be passed to the controller (or other components on the SoC), but where the assertion of the OTP write inhibit bit prevents writes by the controller (or anything else) from occurring. Note also that, as indicated above, while the OTP state machine is not in the third or IDLE state, the controller is held in reset, thus preventing it from accessing the flash memory. More specifically, as discussed above, in response to a system reset, e.g., VTR POR, the reset signal transmitted to the controller may be modified so that reset is asserted both when system reset is asserted and when the OTP state machine is not in an IDLE state (or equivalent).

BRIEF DESCRIPTION OF THE DRAWINGS

The foregoing, as well as other objects, features, and advantages of this invention may be more completely understood by reference to the following detailed description when read together with the accompanying drawings in which.

Figure 1:
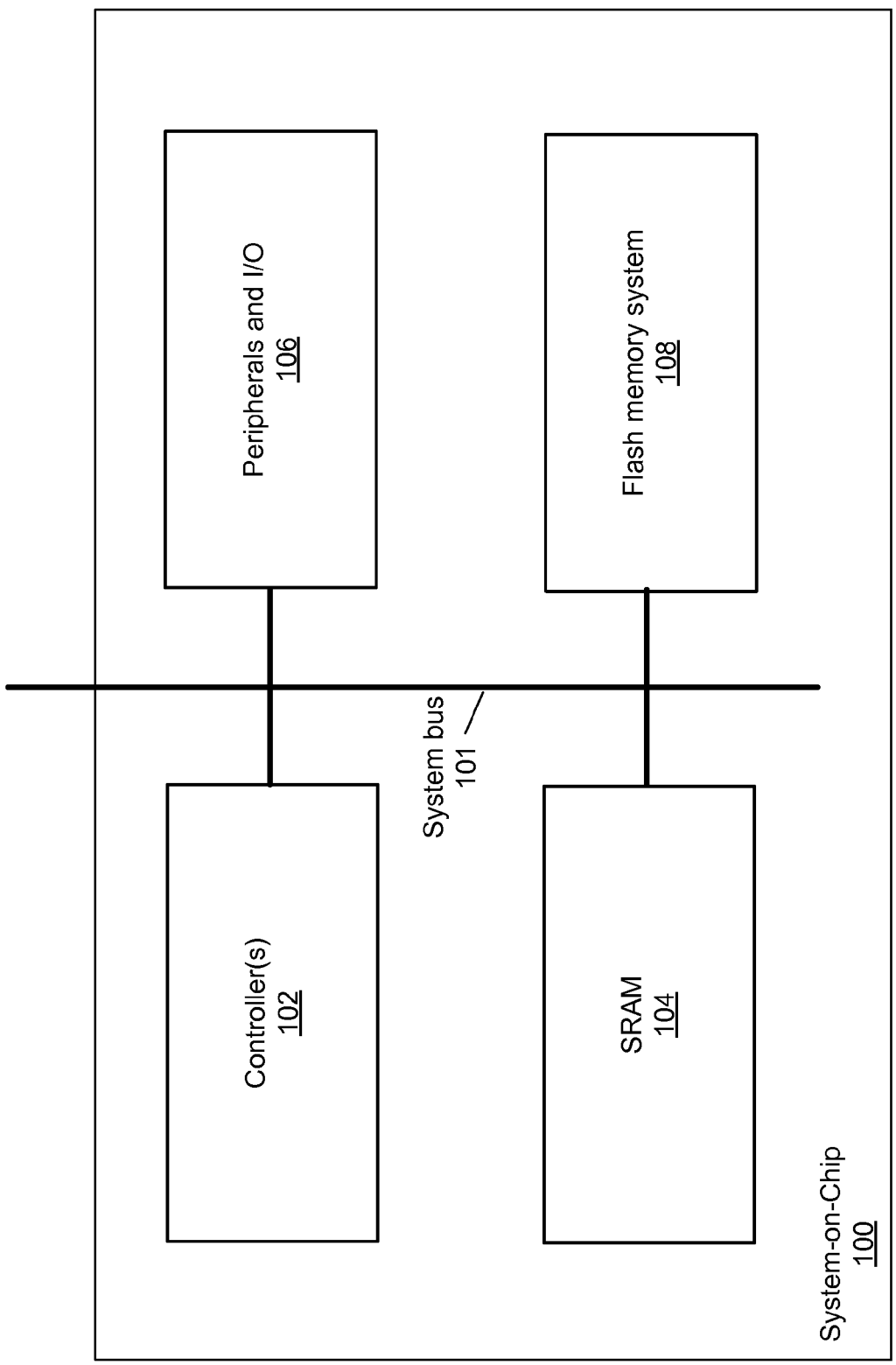
FIG. 1 is a high-level block diagram of an exemplary System-on-Chip (SoC) configured to implement one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

Below are described various embodiments of a system and method for implementing one time programmable (OTP)

memory with embedded flash memory, referred to herein as "flash OTP", in a System-on-Chip (SoC). The flash OTP may be useful in any SoC that uses OTP memory, e.g., for security functions, power-up/reset, and so forth.

As used herein, a "set of instructions" may refer to one or more instructions. More specifically, in some embodiments, "instructions" may refer to programming code, software, and/or functions implemented in the form of a code that is executable by a controller, microprocessor, and/or custom logic circuit adapted to execute these instructions. In some embodiments, these instructions may comprise device drivers, control software, and/or machine code.

As used herein, a "controller" refers to any type of processor or controller, such as a central processing unit (CPU), microprocessor, embedded controller, DMA (direct memory access) controller, or combinations of any of the above, including multi-core processors, multiple processors operating in tandem, etc., among others.

FIG. 1—Exemplary System

FIG. 1 is a high-level block diagram of an exemplary System-on-Chip (SoC) configured to implement one embodiment of the present invention.

As FIG. 1 shows, in this embodiment, an SoC 100 may include at least one controller 102, static random access memory (SRAM) 104, peripherals and I/O 106, and a flash memory system 108, e.g., a flash memory array and flash controller, each coupled to a system bus 101. The system bus 101 may thus facilitate inter-component communication, and may also provide a medium for communication with systems or components external to the SoC. Note that the SoC may be incorporated into any type of system or component as desired. For example, in one embodiment, the SoC may be or be used in a keyboard controller integrated circuit, although other applications for the SoC are contemplated. As noted above, in various embodiments, the at least one controller 102 (which is distinct from the flash memory controller) may include one or more microprocessors, embedded controllers, DMA (direct memory access) controllers, or combinations of any of the above, including multi-core processors, multiple processors operating in tandem, etc., among others.

Figure 5:
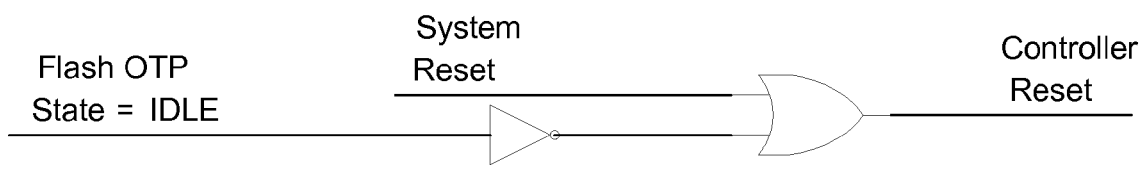
FIG. 5 illustrates controller reset logic, according to one embodiment.

As will be described in more detail below, in preferred embodiments, the flash memory system 108 may be used to implement OTP memory, thereby providing an affordable solution for implementing non-volatile, non-modifiable data storage in a system, e.g., for security purposes. More specifically, in some embodiments, one location in the flash array may be designated as OTP memory, e.g., as "the OTP word", meaning that data may be written to this location once, and only once, at least without having to blank the entire flash memory. Note that the location may be anywhere in the flash array; e.g., the last word in the flash, the last word in the first block, and so forth, as desire, but is preferably at a fixed location for any particular SoC design. The flash memory controller may include an OTP state machine that may be used to implement OTP memory functionality, as will be described in detail below. In response to a system reset, e.g., VTR POR, the reset signal transmitted to the at least one controller may be modified so that reset is asserted both when system reset is asserted and when the OTP state machine is not in an IDLE state (or equivalent). The OTP state machine may respond to the deassertion of the system reset signal and read the OTP word from the flash memory. Note that the OTP state machine may hold the controller in reset while setting up the OTP memory. FIG. 5, described below, illustrates how the controller may be held in reset, according to one embodiment.

Figure 2:
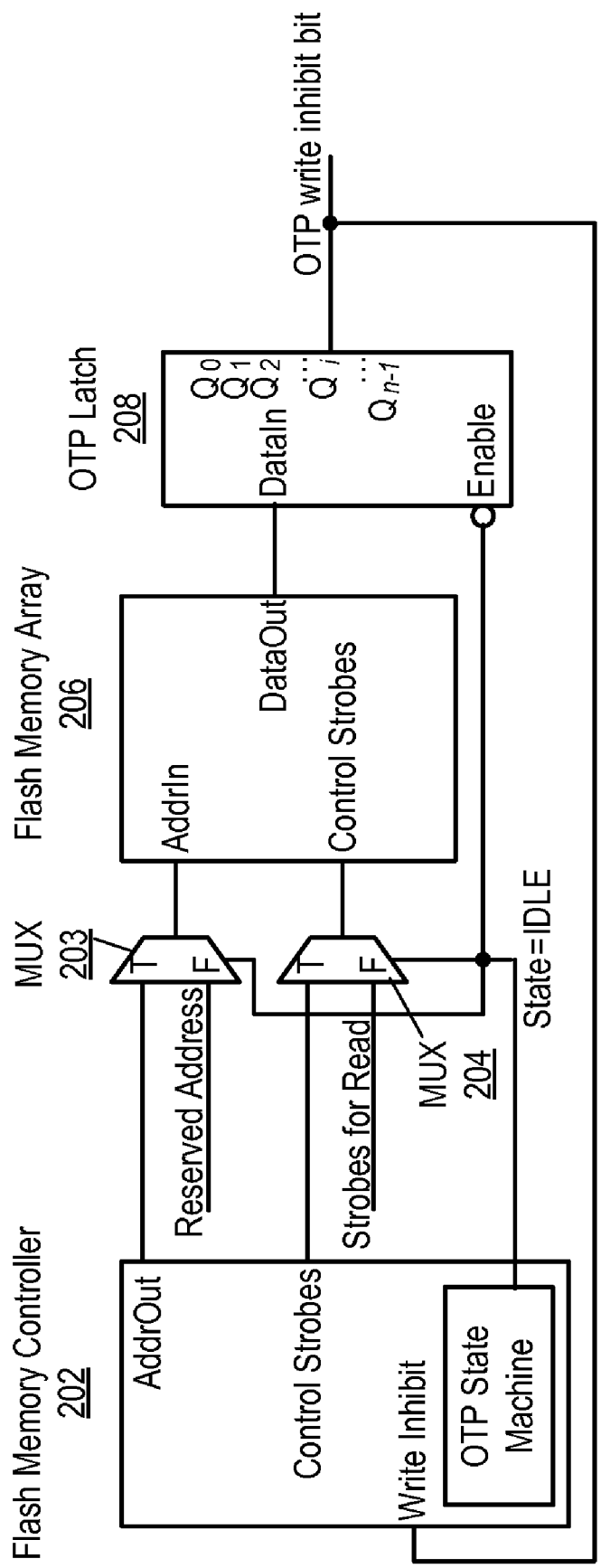
FIG. 2 is a block diagram of the flash memory system of FIG. 1, according to one embodiment.

FIG. 2—System for Implementing OTP Memory with Flash Memory

FIG. 2 is a high-level block diagram of an exemplary system for implementing OTP memory using flash memory, according to one embodiment. As FIG. 2 shows, a flash memory controller 202 may be coupled to multiplexers (MUXes) 203 and 204, both coupled to a flash memory array 206, which includes an OTP block, i.e., memory reserved for OTP functionality, which itself includes a write inhibit field for denoting inhibition of writes (including erasure) to the OTP block. Note that the OTP block may initially be in a cleared state, which entails the write inhibit field being deasserted.

Thus, in some embodiments, the system may include a flash memory array, including an OTP block that includes an OTP write inhibit field, where the OTP write inhibit field is initially deasserted, a latch, coupled to the flash memory, where the latch includes volatile memory, a flash memory controller, coupled to the flash memory and the latch, and a controller coupled to the flash memory array, the latch, and the flash memory controller.

The flash memory controller may implement an OTP state machine that controls implementation and operation of OTP functionality with respect to the OTP block. The flash memory array 206 is coupled to an OTP latch 208, e.g., volatile memory, such as a volatile OTP register. As FIG. 2 also shows, the MUXes 203/204 and the OTP latch 208 are also configured to receive a state indicator (from the OTP state machine) denoting whether the OTP state machine is in the IDLE state, as will be explained in more detail below. As indicated, the OTP latch 208 may be operable to latch data read from the flash memory array, e.g., at least a portion of the OTP block, including the contents of the write inhibit field. As shown, the latched data is designated "$Q_0$-$Q_{n-1}$", and includes the contents of the write inhibit field, designated "$Q_i$", which may be asserted as an OTP write inhibit bit. Further details of this writing and latching are provided below.

Note that the MUXes, interposed between the flash memory controller 202 and the flash memory array 206, are configured to pass normal, i.e., non-OTP block, addresses (MUX 203) and normal control strobes (MUX 204) when the OTP state machine is in the IDLE state (when "state=IDLE" is true), but to pass OTP block addresses, referred to as "reserved addresses", and special strobes for reading from the OTP block, when the OTP state machine is not in the IDLE state (when "state=IDLE" is false).

As may be seen, this write inhibit bit may be received by the flash memory controller 202, and may be used to inhibit writes (including erasure) to the OTP block. For example, consider operation of the circuit before and after the write inhibit bit has been asserted:

Prior to latching/asserting the write inhibit bit, and while the OTP state machine is not in the IDLE state, i.e., "state=IDLE" is false, the OTP latch 208 is enabled (due to the inversion of the state indication at the latch), and the MUXes are configured to allow reads from the OTP block of the flash memory array 206. Thus, the system is operable to read and latch at least a portion of the OTP block of the flash memory, including the OTP write inhibit field, after which the OTP write inhibit bit may be asserted. Note that this non-IDLE state (or states) occurs before the controller of the SoC performs any function, i.e., before system operations can be performed. Once the OTP state machine is in the IDLE state, the OTP latch is disabled (preventing further updates to the latched data), and the MUXes allow the flash memory controller 202 to perform normal read and write operations to flash memory, i.e., via the AddrOut and Control Strobes lines to the MUXes.

After latching/asserting the write inhibit bit, the controller of the SoC is taken out of reset, i.e., is allowed to transition out of reset, and thus to operate normally, e.g., reading and writing to the flash memory, so long as no writes are made to the OTP block, such writes being inhibited by the asserted OTP write inhibit bit. Note also that any data stored by the OTP latch (register) may be available, i.e., may be read, by the controller, or any other system or sub-system in or coupled to the SoC, as desired.

As also indicated in FIG. 2, in some embodiments, the flash memory controller 202 may include an OTP state machine, described in more detail below, which may be used to control the OTP functionality of the flash memory system.

Figure 3:
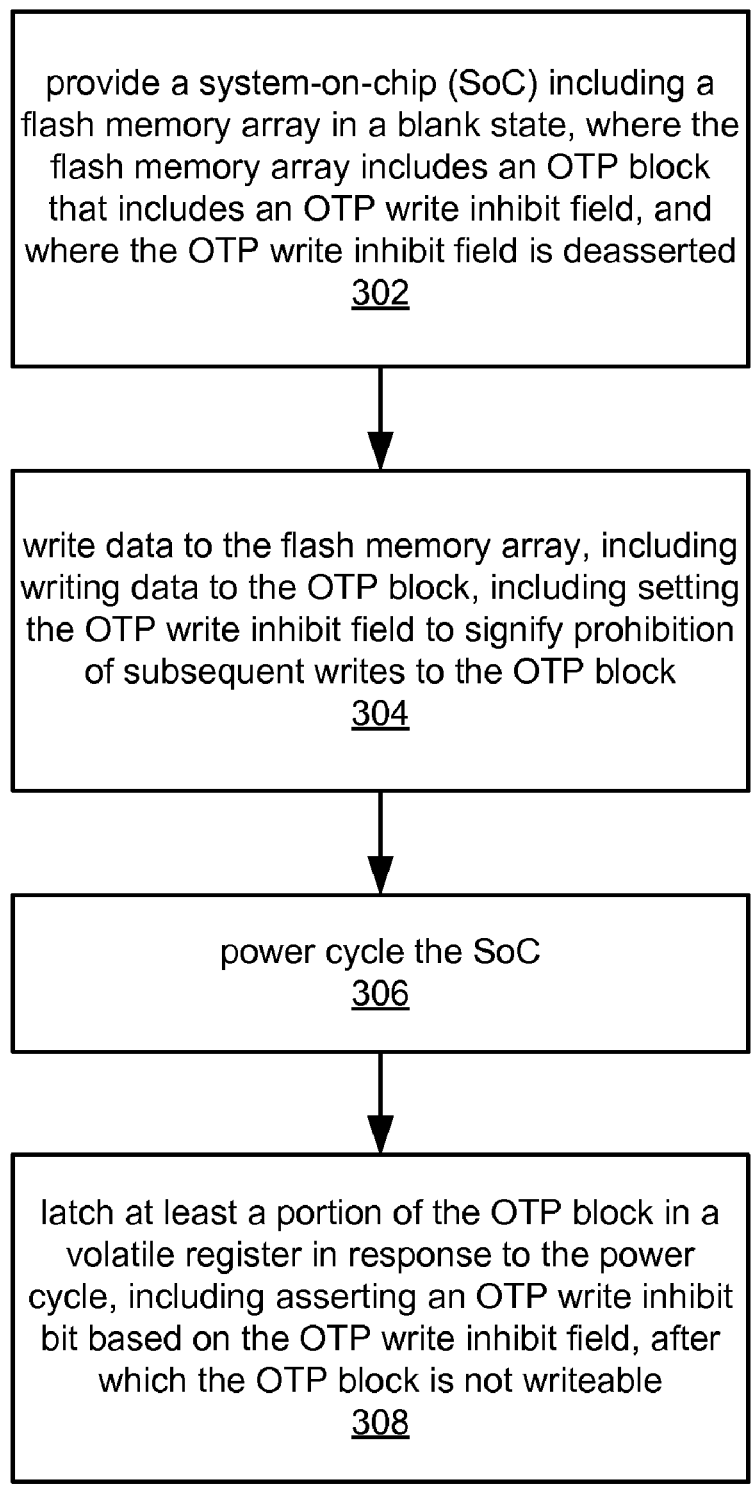
FIG. 3 is a flowchart of a method for implementing one time programmable (OTP) memory with embedded flash memory in an SoC, according to one embodiment.

FIG. 3—Method for Implementing OTP Memory with Embedded Flash Memory

FIG. 3 is a flowchart of a method for implementing one time programmable (OTP) memory using flash memory in a system-on-chip (SoC). In various embodiments, some of the method elements shown may be performed concurrently, in a different order than shown, or may be omitted. Additional method elements may also be performed as desired. As shown, this method may operate as follows.

In 302, an SoC may be provided, where the SoC includes a flash memory array in a blank or cleared state. The flash memory array preferably includes an OTP block that includes an OTP write inhibit field, where the OTP write inhibit field is deasserted (since the entire memory array is in a blank state). Note that in some embodiments, the flash memory array being in a blank state means that the memory is set to all ones.

In 304, data may be written to the OTP block, wherein writing the data includes setting the OTP write inhibit field to signify prohibition of subsequent writes to the OTP block. In some embodiments, the SoC also includes a controller and a flash memory controller coupled to the flash memory array for reading from and writing to the flash memory array. The controller may be operable to perform this write to the OTP block including setting the OTP write inhibit field for inhibition of subsequent writes to the OTP block. Note that, as mentioned above, in various embodiments, the controller (which is distinct from the flash memory controller) may include at least one embedded controller, at least one embedded processor, and/or at least one DMA controller. Note that the controller may be a hardware controller, or may be a combination of hardware and software.

In 306, the SoC may be power cycled, i.e., turned off and back on. As is well known, power cycling may include asserting and deasserting a system reset signal, e.g., a VTR POR signal, which may be used in implementing OTP functionality, as will be described below.

In 308, in response to the power cycling of 306, at least a portion of the OTP block, i.e., data in the OTP block, may be latched in a volatile memory, including asserting an OTP write inhibit bit based on the OTP write inhibit field, after which the OTP block is not writeable. The volatile memory used to latch the data from the OTP block may be or include a volatile register, e.g., an OTP register. As used herein, this volatile memory and the means for latching data in the memory may be referred to as a "latch" or "OTP latch", although it should be noted that this term is intended to denote the latching functionality, not any particular method or means for performing the latching.

As noted above, in some embodiments, the SoC also includes a controller and a flash memory controller coupled to the flash memory array for reading from and writing to the flash memory array. Latching at least a portion of the OTP block may include: in response to deasserting system reset, holding the controller in reset, sending an address of the OTP block to the flash memory array as input, sequencing the flash memory array to read data from the OTP block at the address, and latching the data read from the OTP block in the volatile memory, including asserting the OTP write inhibit bit. Thus, in some embodiments, the controller may be prevented from doing anything (e.g., reading or writing to flash memory) while the OTP memory block is being initialized and the data are latched. In some embodiments, the flash memory controller may perform this latching of the data.

Note that asserting the OTP write inhibit bit is used to implement or enforce the OTP nature of the OTP block. For example, in response to latching the data, the controller may be released from reset, and the flash array may be configured to be controlled by the controller, where the OTP block is or includes OTP memory. Thereafter, in response to any subsequent power cycling of the SoC, the above latching at least a portion of the OTP block, the releasing the controller from reset, and the configuring the flash array to be controlled by the controller may be performed, thereby initializing or preparing the flash memory system for OTP functionality. Note that since these operations are performed in response to a system reset, by the time the controller is given control of flash memory operations (i.e., is released from reset), the flash OTP memory functionality has been established, including asserting the write inhibit bit, and so the controller never has an opportunity to circumvent the OTP aspects of the OTP block.

In some embodiments, the flash memory controller implements an OTP state machine that includes and utilizes various states to control or orchestrate the above OTP memory functionality. For example, in one embodiment, the OTP state machine includes a first state, in which the controller is held in reset, and the SoC is initialized for the above-described latching; a second state, in which the controller is held in reset, and data are read from the OTP block and latched; and a third state, in which the controller is released from reset, and the flash memory array is configured for use by the SoC, where the OTP block comprises OTP memory. In other words, when the OTP state machine is in the third state, the OTP block in flash memory operates as OTP memory. The following provides more detailed descriptions of some of these states and operations.

It should be noted that these states are meant to be illustrative of the OTP state machine, and should be considered to be exemplary, and not limiting as to the particular number and type of states contemplated. For example, in some embodiments, the first, second, and third states may comprise INIT, READ FLASH, and IDLE, or functional equivalents. In other embodiments, the OTP state machine may operate with only two states, e.g., READ FLASH and IDLE (or functional equivalents). Other states may be used as desired.

Figure 4:
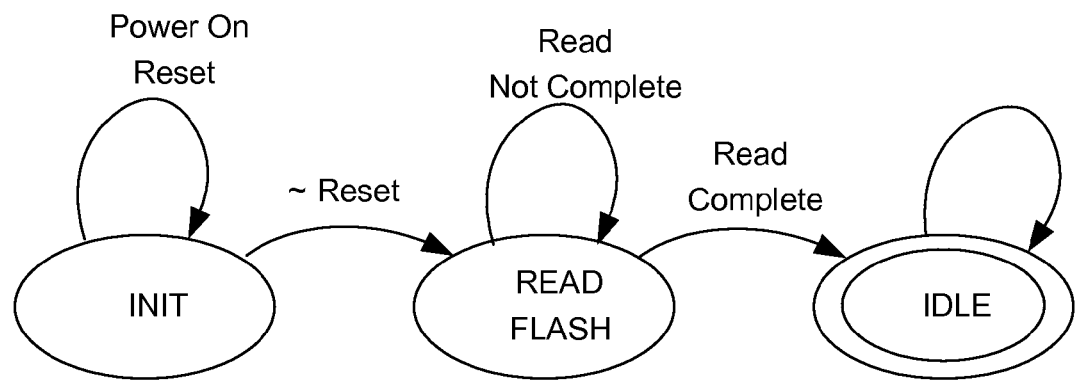
FIG. 4 illustrates a flash memory state machine, according to one embodiment.

FIG. 4 illustrates an exemplary OTP state machine that uses INIT, READ FLASH, and IDLE states to control the above OTP-related operations. As FIG. 4 illustrates, in response to a power on reset (or more generally, a system reset), the OTP state machine enters an INIT state (the first state described above).

Regarding this first state, in one embodiment, in initializing the SoC for latching, the flash memory controller may be initialized for a read operation in the flash memory array, an address input to the flash memory array may be initialized for starting a read at the address of the OTP block, and the volatile memory may be set to capture output of the flash memory array.

As FIG. 4 also shows, a deassertion of the system reset signal (e.g., deassertion of power on reset) may cause a transition of the OTP state machine to the second state, e.g., the READ FLASH state, during which the at least a portion of the OTP block may be read and latched, as described above. In one embodiment, in the data being read from the OTP block and latched, the flash memory array may be sequenced to read the data at the address of the OTP block, and the volatile memory (e.g., an OTP register) may capture and hold the output of the flash memory array to perform the latching of the data.

As also indicated in FIG. 4, once the read from flash memory is complete, the OTP state machine may transition to the third state, e.g., the IDLE state, described above. In one embodiment, in configuring the flash memory array for use by the SoC as OTP memory, control and address signals for the flash memory array from the controller or other components on the SoC may be provided to the flash memory array by the flash memory controller, the volatile memory may retain the value captured during the second state, the controller may be released from reset, and the write inhibit bit may be fed back to the flash memory controller to inhibit any writes to the OTP block. Note that in preferred embodiments, the duration of the READ FLASH state may be a specified time interval that is at least long enough to complete a read from flash memory. However, in other embodiments, the completion of the read from flash memory may be detected, and the OTP may transition to the third state in response to this detection.

Said another way (at a high level), in some embodiments, after system reset (e.g., VTR POR) is deasserted, the controller may be held in reset, and the flash OTP address may be sent to the flash memory address input. The OTP state machine may sequence the flash memory to read the data at the flash OTP address, and the data may be latched in volatile memory, e.g., in an OTP register that is read-only by the software, after which the controller reset may be deasserted, the flash memory address input may be connected to the controller, and the OTP state machine may go idle until the next system reset (e.g., VTR POR). Note that at the end of this sequence, the OTP latch (e.g., the OTP register) contains data that cannot be modified by software, including the write inhibit bit, which inhibits the system from erasing or programming the data at the Flash OTP address. Note that the data stored in the OTP block may include any data that should be kept safe from unauthorized tampering. Examples of data contemplated for storage in the OTP block include, but are not limited to, product-related information, such as serial number, revision number, part number, product options-change features, turn on-off configuration data (e.g., serial connects), calibration information, e.g., A/D D/A calibration information, and so forth, among others.

Thus, in terms of OTP state machine operations, in one embodiment, the performing the latching at least a portion of the OTP block, the releasing the controller from reset, and the configuring the flash array to be controlled by the controller, in response to any subsequent power cycling of the SoC, may include: in response to the asserting system reset, setting the OTP state machine to the first state (e.g., INIT); in response to the deasserting system reset, setting the OTP state machine to the second state (READ FLASH) for a specified time interval, where the specified time interval is equal to or greater than a minimum required read time for the flash memory array; and in response to the specified time interval elapsing, setting the OTP state machine to the third state (e.g., IDLE).

Once the OTP state machine is in the third (e.g., IDLE) state, the controller may perform flash memory reads and writes for the SoC while the OTP state machine is in the IDLE state. Note that the OTP state machine may stay in this third or IDLE state until the next system reset. Thus, once the OTP memory functionality has been established, control of reads and writes to flash memory may be passed to the controller (or other components on the SoC), but where the assertion of the OTP write inhibit bit prevents writes by the controller (or anything else) from occurring. Note also that, as indicated above, while the OTP state machine is not in the third or IDLE state, the controller is held in reset, thus preventing it from accessing the flash memory. More specifically, as discussed above, in response to a system reset, e.g., VTR POR, the reset signal transmitted to the controller may be modified so that reset is asserted both when system reset is asserted and when the OTP state machine is not in an IDLE state (or equivalent).

FIG. 5 illustrates an exemplary way that this enforcement of controller reset may be implemented, according to one embodiment. As may be seen, in this example, the system reset signal is ORed with the inverse or negation of the logical condition "flash OTP state=IDLE". In other words, either the system reset or the OTP state machine not being in IDLE (or an equivalent state) will cause the controller to be in reset. Conversely, when system reset is not asserted and the OTP state machine is in IDLE (or an equivalent state), the controller is not in reset, and so can operate normally, subject to limitations imposed by the OTP write inhibit bit. It should be noted, however, that the technique or logical operations shown in FIG. 5 are meant to be exemplary only, and any other logical operations or techniques may be used as desired to perform this functionality.

In various embodiments, the OTP write inhibit bit may be used to enforce different OTP functionalities with respect to the flash memory OTP block. For example, in one embodiment, after asserting the OTP write inhibit bit, the flash array cannot be erased at all. In another embodiment, after asserting the OTP write inhibit bit, the OTP block cannot be erased without erasing the entire flash array, i.e., the OTP block may be erased, but only by clearing (e.g., setting to all 1's) the entire flash memory. In yet another embodiment, after asserting the OTP write inhibit bit, the OTP block cannot be erased, but other flash array blocks can be erased. In other words, the system may selectively prevent the OTP block from being erased, but may allow other portions of the flash memory to be erased.

Said another way, if the write-inhibit function is configured to inhibit the flash erase function in the flash row that contains the flash OTP block or word, the flash OTP implements or emulates true OTP: once programmed and set in the locked state, it cannot be changed except by physically manipulating the die. If the write-inhibit function permits either a page erase on the flash OTP word or a mass erase, the flash OTP function implements a reversible OTP. Once locked, it can be unlocked, but only after any other information in the Flash OTP word is erased, thereby protecting any secret information that had been in the Flash OTP.

Turning back to FIG. 2, as described above, in some embodiments, the MUXes interposed between the flash memory controller 202 and the flash memory array 206 may be controlled by the OTP state machine to distinguish between "normal" reads/writes to the flash memory array and reads from the OTP block. Similarly, the OTP write inhibit bit may control writes to the flash memory array, preventing writes to the OTP block, and allowing writes to other portions of the flash memory array.

Figure 6:
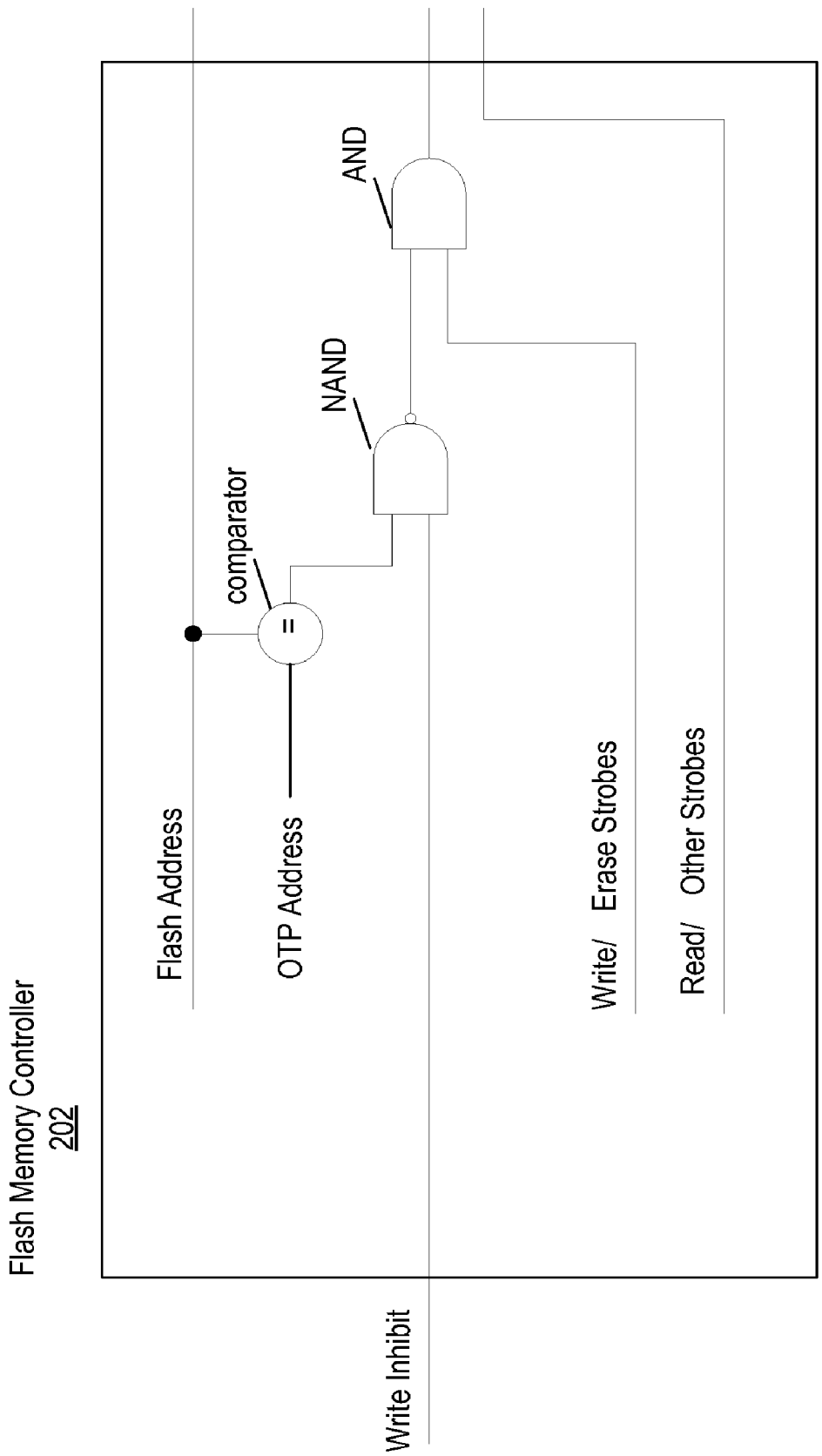
FIG. 6 illustrates flash memory controller functionality whereby the OTP block in flash memory is protected from modification, according to one embodiment.

FIG. 6 illustrates one embodiment of logic that may be used by the flash memory controller to control write operations to the flash memory array. In one embodiment, the flash memory controller may determine if a flash memory address for a write operation is in the OTP block in the flash memory array, and if this is the case, may determine if the write inhibit bit is asserted. If the write inhibit bit is asserted and the flash address is in the OTP block, the write operation is prevented; otherwise, the write operation is allowed to proceed. More specifically, as indicated in FIG. 6, in this embodiment, the write address and the OTP address range is provided to a comparator, which may determine whether the flash address is within the OTP block, and may provide a corresponding indication to a NAND gate. For example, if the address is in the OTP block, a "1" may be provided to the NAND gate. The NAND gate may NAND this signal with the current value of the OTP write inhibit bit, and send the resulting signal to an AND gate, as shown. Note that the NAND gate will output a "0" if the flash address is in the OTP address range and the write inhibit bit is asserted, but will output a "1" if either the flash address is not in the OTP address range, or if the write inhibit bit is not asserted (or both). This output is then provided to an AND gate, which ANDs the signal with the write/erase strobe intended to invoke the write operation. Thus, if the output of the NAND gate is "0", meaning that the flash address is in the OTP address range and the write inhibit bit is asserted, any write/erase strobe will be nulled, and so the write operation will not be performed. Conversely, if the output of the NAND gate is "0", meaning that either the flash address is not in the OTP address range, or the write inhibit bit is not asserted, or both, the write operation will be performed.

Thus, when the write-inhibit-field is all 1's (the default value for an erased flash memory), the flash controller may permit writes to the flash memory in the OTP block address range. When the write-inhibit-field is set, e.g., to a write-inhibit code, the OTP data cannot be changed. This feedback from the Flash OTP data to the flash controller is what makes the OTP block or word one-time programmable.

Note that the (data in the) OTP latch cannot be changed under software control, since its input comes only from the flash memory array. The latch is set just after system reset, and because it is controlled by the flash OTP state machine, will not change until the system is reset.

Thus, various embodiments of the above systems and methods may be used to implement one time programmable (OTP) memory using flash memory.

We claim:

1. A method for implementing one time programmable (OTP) memory functionality using erasable non-OTP flash memory in a system-on-chip (SoC), the method comprising:
    providing an SoC, wherein the SoC comprises an erasable non-OTP flash memory array in a blank state, wherein the erasable non-OTP flash memory array comprises a first block comprising an OTP write inhibit field, and wherein the OTP write inhibit field is deasserted;
    writing data to the first block, comprising setting the OTP write inhibit field to signify prohibition of subsequent writes to the first block;
    power cycling the SoC after said writing data to the first block; and
    latching at least a portion of the first block in a volatile memory, in response to said power cycling, including asserting an OTP write inhibit bit based on the OTP write inhibit field, after which the first block is not writeable, thereby implementing OTP memory functionality in the first block of the erasable non-OTP flash memory.

2. The method of claim 1, wherein the SoC further comprises a first controller and a flash memory controller coupled to the flash memory array for reading from and writing to the flash memory array, wherein said power cycling comprises asserting and deasserting a system reset signal, and wherein said latching at least a portion of the first block comprises:
    in response to said deasserting the system reset signal, holding the first controller in reset;
    sending an address of the first block to the flash memory array as input;
    sequencing the flash memory array to read data from the first block at the address; and
    latching the data read from the first block in the volatile memory, including said asserting the OTP write inhibit bit.

3. The method of claim 2, further comprising:
    in response to said latching the data,
    releasing the first controller from reset; and
    configuring the flash array to be controlled by the first controller, wherein the first block comprises OTP memory functionality.

4. The method of claim 3, further comprising:
    in response to any subsequent power cycling of the SoC, performing said latching at least a portion of the first block, said releasing the first controller from reset, and said configuring the flash array to be controlled by the first controller.

5. The method of claim 4, wherein the SoC further comprises a first controller and a flash memory controller coupled to the flash memory array for reading from and writing to the flash memory array, and wherein the flash memory controller implements an OTP state machine comprising:
    a first state, wherein:
        the first controller is held in reset; and
        the SoC is initialized for said latching;
    a second state, wherein:
        the first controller is held in reset;
        data are read from the first block and latched; and
    a third state, wherein:
        the first controller is released from reset; and
        the flash memory array is configured for use by the SoC, wherein the first block comprises OTP memory functionality.

6. The method of claim 5,
    wherein, in initializing the SoC for said latching:
        the flash memory controller is initialized for a read operation in the flash memory array;
        an address input to the flash memory array is initialized for starting a read at the address of the first block;
        the volatile memory is set to capture output of the flash memory array; and
    wherein, in data being read from the first block and latched:
        the flash memory array is sequenced to read the data at the address of the first block;
        the volatile memory captures and holds the output of the flash memory array to perform said latching the data; and
    wherein, in configuring the flash memory array for use by the SoC as OTP memory:
        control and address signals for the flash memory array from the first controller or other components on the SoC are provided to the flash memory array by the flash memory controller;
        the volatile memory retains the value captured during the second state;
        the first controller is released from reset; and
        the write inhibit bit is fed back to the flash memory controller to inhibit any writes to the first block.

7. The method of claim 6, wherein, said performing said latching at least a portion of the first block, said releasing the first controller from reset, and said configuring the flash array to be controlled by the first controller, in response to any subsequent power cycling of the SoC, comprises:
    in response to said asserting the system reset signal, setting the OTP state machine to the first state;

in response to said deasserting the system reset signal, setting the OTP state machine to the second state for a specified time interval, wherein the specified time interval is equal to or greater than a minimum required read time for the flash memory array; and in response to the specified time interval elapsing, setting the OTP state machine to the third state.

8. The method of claim 7,
wherein the first state of the OTP state machine is an INIT state;
wherein the second state of the OTP state machine is a READ FLASH state; and
wherein the third state of the OTP state machine is an IDLE state.

9. The method of claim 7, further comprising:
the first controller performing flash memory reads and writes for the SoC while the OTP state machine is in the IDLE state.

10. The method of claim 1, wherein, after asserting the OTP write inhibit bit, the flash array cannot be erased.

11. The method of claim 1, wherein, after asserting the OTP write inhibit bit, the first block cannot be erased without erasing the entire flash array.

12. The method of claim 1, wherein, after asserting the OTP write inhibit bit, the first block cannot be erased, but other flash array blocks can be erased.

13. A system for implementing one time programmable (OTP) memory functionality using erasable non-OTP flash memory in a system on chip (SoC), comprising:
an erasable non-OTP flash memory array, wherein the flash memory array includes an first block comprising an OTP write inhibit field, and wherein the OTP write inhibit field is initially deasserted;
a latch, coupled to the flash memory, wherein the latch comprises volatile memory;
a flash memory controller, coupled to the flash memory and the latch; and
a first controller coupled to the flash memory array, the latch, and the flash memory controller;
wherein the first controller is configured to write data to the first block, comprising setting the OTP write inhibit field to signify prohibition of subsequent writes to the first block; and
wherein, in response to power cycling the SoC, the flash memory controller is configured to latch at least a portion of the first block in a volatile memory, including asserting an OTP write inhibit bit based on the OTP write inhibit field, after which the first block is not writeable, thereby implementing OTP memory functionality in the first block of the erasable non-OTP flash memory.

14. The system of claim 13, wherein said power cycling comprises asserting and deasserting a system reset signal, and wherein to latch at least a portion of the first block the flash memory controller is configured to:
in response to said deasserting the system reset signal, hold the first controller in reset;
send an address of the first block to the flash memory array as input;
sequence the flash memory array to read data from the first block at the address; and
latch the data read from the first block in the volatile memory, including said asserting the OTP write inhibit bit.

15. The system of claim 14, wherein the flash memory controller is further configured to:
in response to said latching the data,
release the first controller from reset; and
configure the flash array to be controlled by the first controller, wherein the first block comprises OTP memory functionality.

16. The system of claim 15, wherein the flash memory controller is further configured to:
in response to any subsequent power cycling of the SoC, perform said latching at least a portion of the first block, said releasing the first controller from reset, and said configuring the flash array to be controlled by the first controller.

17. The system of claim 16, wherein the flash memory controller implements an OTP state machine comprising:
a first state, wherein:
the first controller is held in reset; and
the SoC is initialized for said latching;
a second state, wherein:
the first controller is held in reset;
data are read from the first block and latched; and
a third state, wherein:
the first controller is released from reset; and
the flash memory array is configured for use by the SoC, wherein the first block comprises OTP memory functionality.

18. The system of claim 17,
wherein, in initializing the SoC for said latching:
the flash memory controller is initialized for a read operation in the flash memory array;
an address input to the flash memory array is initialized for starting a read at the address of the first block;
the volatile memory is set to capture output of the flash memory array; and
wherein, in data being read from the first block and latched:
the flash memory array is sequenced to read the data at the address of the first block;
the volatile memory captures and holds the output of the flash memory array to perform said latching the data; and
wherein, in configuring the flash memory array for use by the SoC as OTP memory:
control and address signals for the flash memory array from the first controller or other components on the SoC are provided to the flash memory array by the flash memory controller;
the volatile memory retains the value captured during the second state;
the first controller is released from reset; and
the write inhibit bit is fed back to the flash memory controller to inhibit any writes to the first block.

19. The system of claim 18, wherein, to perform said latching at least a portion of the first block, said releasing the first controller from reset, and said configuring the flash array to be controlled by the first controller, in response to any subsequent power cycling of the SoC, the flash memory controller is configured to:
in response to said asserting the system reset signal, set the OTP state machine to the first state;
in response to said deasserting the system reset signal, set the OTP state machine to the second state for a specified time interval, wherein the specified time interval is equal to or greater than a minimum required read time for the flash memory array; and
in response to the specified time interval elapsing, set the OTP state machine to the third state.

20. The system of claim 19,
wherein the first state of the OTP state machine is an INIT state;

wherein the second state of the OTP state machine is a READ FLASH state; and wherein the third state of the OTP state machine is an IDLE state.

21. The system of claim 19, wherein the first controller is configured to perform flash memory reads and writes for the SoC while the OTP state machine is in the IDLE state.

22. The system of claim 13, wherein, after asserting the OTP write inhibit bit, the flash array cannot be erased.

23. The system of claim 13, wherein, after asserting the OTP write inhibit bit, the first block cannot be erased without erasing the entire flash array.

24. The system of claim 13, wherein, after asserting the OTP write inhibit bit, the first block cannot be erased, but other flash array blocks can be erased.

25. The system of claim 13, wherein the first controller comprises one or more of:

at least one embedded controller;

at least one embedded processor; or at least one direct memory access (DMA) controller.

* * * * *